US010804785B2

United States Patent
Liu et al.

(10) Patent No.: US 10,804,785 B2
(45) Date of Patent: Oct. 13, 2020

(54) CONTROL SYSTEM AND VIBRATION CONTROL METHOD FOR LINEAR RESONANT ACTUATOR

(71) Applicant: TOPRAY MEMS INC., Hsinchu (TW)

(72) Inventors: Chin-Sung Liu, Hsinchu (TW); Shin-Ter Tsai, Hsinchu (TW); Tzu-Kuang Fang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 16/535,094

(22) Filed: Aug. 8, 2019

(65) Prior Publication Data

US 2020/0059149 A1    Feb. 20, 2020

(30) Foreign Application Priority Data

Aug. 14, 2018    (TW) ............................... 107128316 A

(51) Int. Cl.
*H02K 33/18*    (2006.01)

(52) U.S. Cl.
CPC .................................... *H02K 33/18* (2013.01)

(58) Field of Classification Search
None
See application file for complete search history.

(56) References Cited

U.S. PATENT DOCUMENTS

| 4,441,060 A * | 4/1984 | Hamer ................... H02K 33/14 198/763 |
| 4,680,968 A * | 7/1987 | Sodeikat ............... G02B 7/1821 73/651 |
| 4,743,821 A * | 5/1988 | Hall ........................... B41J 9/50 101/93 |
| 5,838,515 A * | 11/1998 | Mortazavi .............. G11B 5/022 360/78.12 |
| 2004/0228216 A1* | 11/2004 | Butler ...................... H04R 1/44 367/141 |
| 2008/0001484 A1* | 1/2008 | Fuller .................... H02K 33/16 310/15 |
| 2011/0133578 A1* | 6/2011 | Choi ...................... H02K 33/18 310/25 |
| 2012/0169148 A1* | 7/2012 | Kim ....................... H02K 33/16 310/25 |

* cited by examiner

*Primary Examiner* — Bentsu Ro
(74) *Attorney, Agent, or Firm* — Lin & Associates Intellectual Property, Inc.

(57) ABSTRACT

The invention discloses a control system and a vibration control method for an LRA. The vibration control method comprises: providing an induction coil, the arrangement and the winding of the induction coil able to obtain an inductive voltage proportional to LRA vibration speed; generating a vibration signal according to inductive voltage and feeding back to a driver connected to the LRA to control the vibration of LRA; wherein the generated vibration signal satisfying the following: when induction voltage is lower than a low-speed threshold, the vibration signal causes the driver to apply a driving force in the same direction; when induction voltage is higher than a high-speed threshold, the vibration signal causes the driver to apply a driving force in the opposite direction; when induction voltage is between the low-speed threshold and the high-speed threshold, the vibration signal does not force the driver to apply force.

11 Claims, 8 Drawing Sheets

CONTROL SYSTEM AND VIBRATION CONTROL METHOD FOR LINEAR RESONANT ACTUATOR

CROSS-REFERENCE TO RELATED APPLICATION

The present application is based on, and claims priority form, Taiwan Patent Application No. 107128316, filed Aug. 14, 2018, the disclosure of which is hereby incorporated by reference herein in its entirety.

TECHNICAL FIELD

The present invention relates generally to a control system and vibration control method for linear resonant actuator.

BACKGROUND

With the generalization of mobile devices, linear resonant actuators (LRAs) have also received increasing attention. The mobile device can provide vibration using a linear resonant actuator as a tactile feedback when the user operates the device.

FIG. 1 is a schematic view of the structure of a conventional linear resonant actuator, wherein the linear resonant actuator 100 comprises at least a vibrator 101 containing a magnet, one or more driving coils 102 fixed to a fixed end 105, and a displacement restoring force device 104 connected between the fixed end 105 and the vibrator 101. The linear resonant actuator usually drives a movable magnet with a fixed driving coil, the magnet is connected to a fixed end by a spring, and the spring provides the restoring force of the magnet displacement. Generally, the linear resonant actuator has only an uncontrolled small damping in order to obtain a higher drive efficiency.

A low-damping linear resonant actuator has a frequency response with resonant peak having a high peak and a narrow width; a high peak indicates a higher efficiency when the linear resonant actuator is driven at a resonance frequency, that is, a higher vibration can be obtained with a lower input power; and the narrow bandwidth means that when the driving frequency is only a slight offset from the resonance frequency, and the amount of vibration is greatly reduced, which can be reduced to about 90% or less at about 1 Hz. Due to components and assembly variations, the resonance frequency of each produced linear resonant actuator cannot be guaranteed to be consistent, and the resonance frequency drift may also occur due to differences in operating environment, temperature, and so on, or after long-time operation; the driving device performed better when the operation is kept at the resonant frequency of the linear resonant actuator.

The conventional method is to obtain the back electromotive force (BEMF) of the driving coil as the feedback signal on the vibration control; FIG. 2 shows a schematic view of the feedback of the back electromotive force of the driving coil as the vibration control. Signal control diagram. As shown in FIG. 2, the output of the driver 201 is cut off intermittently by the controller 203 to measure the BEMF of the driving coil in the linear resonant actuator 210 by the measuring circuit 202, and then fed back to the controller 203 to regulate the output to drive the linear resonant actuator 210; however, cutting off the driving means losing the time utilization of the driving; alternatively, the actual output current of the driver 201 and the voltage of driving coil of the linear resonant actuator 210 under driving are measured, and calculating the BEMF of the linear resonant actuator 210 through the measurement circuit 202, and then fed back to the controller 203 to change the output to drive the linear resonant actuator 210. However, in this approach, it is necessary to consider and overcome the computational error caused by uncertain factors such as temperature and component aging. In addition, a Hall element or an accelerometer is often disposed in the linear resonant actuator 210 for position/acceleration detection for control; however, such systems are complicated and require consideration of the stability of the control system.

In another invention application, the inventor disclosed a new linear resonant actuator by adding an induction coil to a driving coil of a conventional linear resonant actuator, and then according to the induction voltage generated by the induction coil, the control method for controlling the linear resonant actuator is achieved by means of feedback. As shown in FIG. 3, the linear resonant actuator having the induction coil includes a vibrator 301, one or more driving coils 302, a displacement restoring force device 304, a fixed end 305, and an induction coil 303; wherein the vibrator 301, the driving coil 302, the displacement restoring force device 304, and the fixed end 305 are the same as the conventional linear resonant actuator of FIG. 1, and the displacement restoring force device 304 further includes at least one elastic member, such as a spring, the vibrator 301 is a vibrator including a magnet set; in other words, one end of the displacement restoring force device 304 is connected to the fixed end 305, and the other end is connected to the vibrator 301; the one or more driving coils 302 are located at the periphery of the vibrator 301. The induction coil 303 is disposed outside the vibrator 301 and is fixed with respect to the vibrator 301. That is, the induction coil 303 is disposed outside the conventional linear resonant actuator, and the induction coil 303 is fixed with respect to the vibrator 301; wherein the induction coil 303 and the driving coil 302 can be located at different positions, or the induction coil 303 and the driving coil 302 may partially overlap.

SUMMARY

An embodiment of the present invention discloses a control system for a linear resonant actuator, which is suitable for a linear resonant actuator having an induction coil for sensing vibration speed of the linear resonant actuator, the control system comprising: a driver, a signal amplifier, an excitation device, a flow controller, and a processing unit, wherein the processing unit further comprising a vibration generating unit; the driver being coupled to the processing unit and the linear resonant actuator to drive the linear resonant actuator according to a driving signal outputted by the processing unit; the signal amplifier being connected to the induction coil of the linear resonant actuator, and the induction voltage of the induction coil of the linear resonant actuator being amplified into an induction signal, and the induction signal being fed back to the vibration generating unit of the processing unit; the excitation device being configured to generate an excitation signal to cause the linear resonant actuator to vibrate, and transmitting the excitation signal to the processing unit; the flow controller being configured to receive an external command, generate a control flow, and output a state signal corresponding to the control flow to the processing unit; the processing unit being connected to the signal amplifier, the excitation device, and the flow controller to output the driving signal to the driver according to the state signal output by the flow controller, wherein the vibration generating unit being connected to the signal amplifier for receiving the induction signal and generating a vibration signal according to the induction signal.

In a preferred embodiment, the state signal can be a stop state, an excitation state, or a continuous vibration state; wherein, in the stop state, the control system does not drive the linear resonant actuator, the control system is used to obtain a DC offset of the induction signal for compensation; wherein, in the excitation state, the excitation device transmits a predetermined waveform, or adjusts frequency, time interval, polarity, amplitude of other adjustable output waveform to achieve vibration; wherein, in the continuous vibration state, the control system amplifies the induction voltage obtained by the induction coil into an induction signal, and outputs the vibration signal to the driver after processing to increase or suppress the vibration of the linear resonant actuator.

Another embodiment of the present invention discloses a flow chart of a vibration control method for a linear resonant actuator, comprising the following steps: providing an induction coil, the induction coil being disposed outside a vibrator of the linear resonant actuator, and the induction coil being fixed with respect to the vibrator, wherein the arrangement and winding manner of the induction coil able to obtain an induction voltage proportional to vibration speed of the vibrator; according to the induction voltage, a vibration signal being generated and fed back to a driver connected to the linear resonant actuator to control the vibration of the linear resonant actuator; wherein the generated vibration signal satisfying the following conditions: when the induction voltage being lower than a low-speed threshold, the vibration signal causing the driver to apply a driving force in the same direction; when the induction voltage being higher than a high-speed threshold, the vibration signal causing the driver to apply a driving force in the opposite direction; when the induction voltage being between the low-speed threshold and the high-speed threshold, the vibration signal not driving the driver to apply force.

In a preferred embodiment, a noise threshold can be set, and the induction voltage below the noise threshold is regarded as noise, and the vibration signal does not drive the driver to apply force.

In a preferred embodiment, at least one group of six voltage values $V1$, $V2$, $V3$, $V4$, $V5$, and $V6$ is set, and $V6 \geq V5 \geq V4 \geq V3 \geq V2 \geq V1$; the six voltage values define seven voltage intervals; wherein, less than $V1$ is the first interval, $[V1, V2]$ is the second interval, $[V2, V3]$ is the third interval, $[V3, V4]$ is the fourth interval, $[V4, V5]$ is the fifth interval, $[V5, V6]$ is the sixth interval, greater than $V6$ is the seventh interval; $V4 \geq Vo \geq V3$ defines the noise threshold, wherein $Vo$ is the induction signal when in stop state, $V5$ and $V2$ respectively define positive and negative low-speed threshold in forward and reverse directions, and $V6$ and $V1$ respectively define positive and negative high-speed threshold in forward and reverse directions.

In other words, when the induction voltage is in the fourth interval (within the noise threshold), the vibration signal is zero, and the driver is not driven to apply force; when the induction voltage is in the first interval or the seventh interval (higher than the high-speed threshold), the vibration signal is positive (negative for seventh interval), that is, a driving force in the opposite direction is applied to reduce the vibration speed; when the induction voltage is in the second interval or the sixth interval (between the high-speed threshold and the low-speed threshold), the vibration signal is zero, and does not drive the driver to apply force, and the oscillator maintains the instantaneous vibration speed; when the induction voltage is in the third interval or the fifth interval (below the low-speed threshold), if the previous half cycle is not in the first interval one or the seventh interval, the vibration signal is negative (positive for the seventh interval), that is, a driving force in the same direction is applied to increase the vibration speed of the vibrator; otherwise, if the previous half cycle is ever in the first interval or the seventh interval, the output of the vibration signal is unspecified; wherein the previous half cycle refers to half a cycle prior to the time point in the interval, and the cycle refers to a specific cycle wherein the linear resonant actuator is driven to maintain a back-and-forth motion in a state of continuous vibration under the continuous vibration state.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The embodiments of the present invention are described by way of specific examples, and those skilled in the art can readily appreciate other advantages and functions of the present invention. The invention may be embodied or applied in various other specific embodiments, and various modifications and changes may be made without departing from the spirit and scope of the invention.

It is to be understood that the structure, the proportions, the size and the like of the drawings are only used to clarify the content disclosed in the specification for understanding and reading by those skilled in the art, and are not intended to limit the present invention, and therefore, not technically meaningful. Any modification of the structure, change of the proportional relationship or adjustment of the size shall fall within the scope of the technical content disclosed in the present invention without affecting the effects and the achievable objectives of the present invention.

Figure 1:
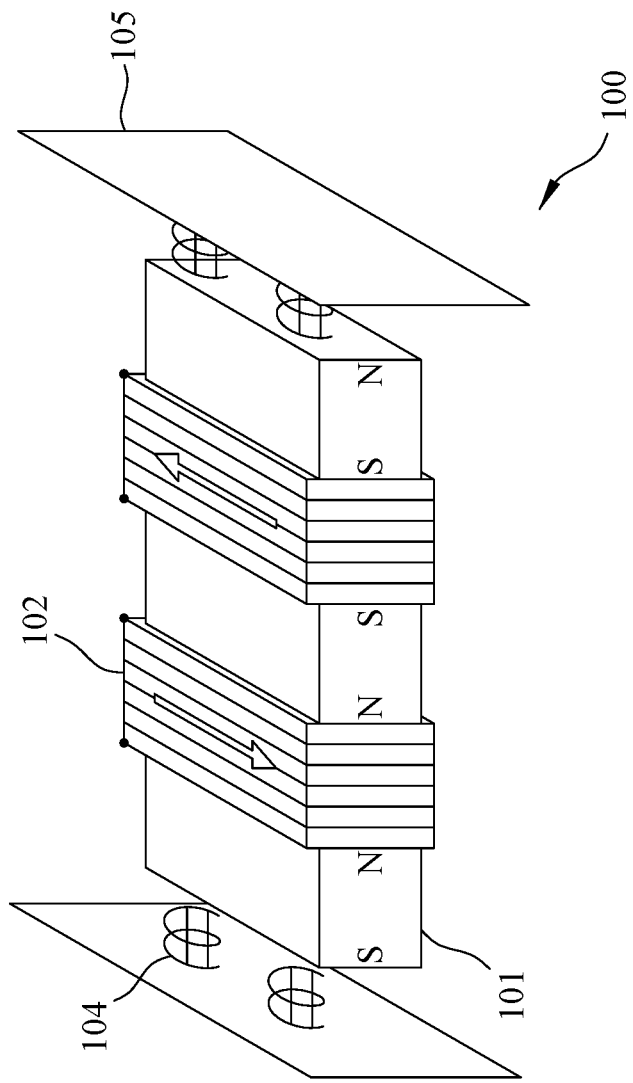
FIG. 1 is a schematic view showing the structure of a conventional linear resonant actuator.
Figure 2:
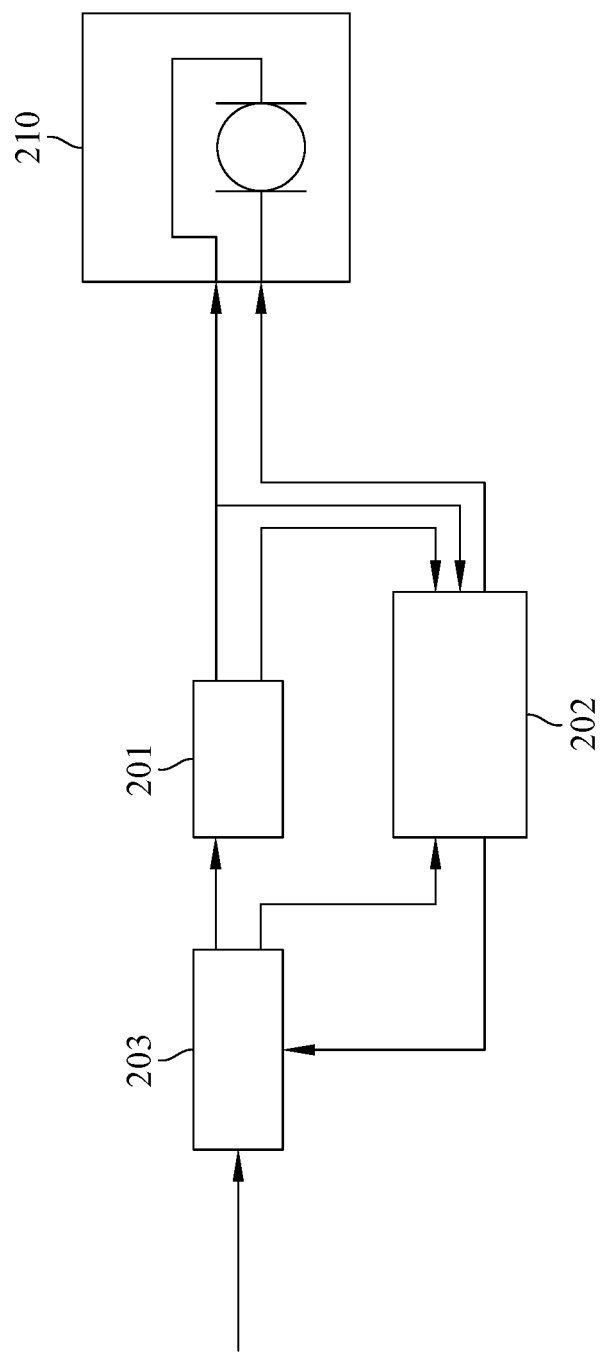
FIG. 2 is a schematic view showing a conventional control approach using the back electromotive force of the driving coil as a feedback signal on the control.
Figure 3:
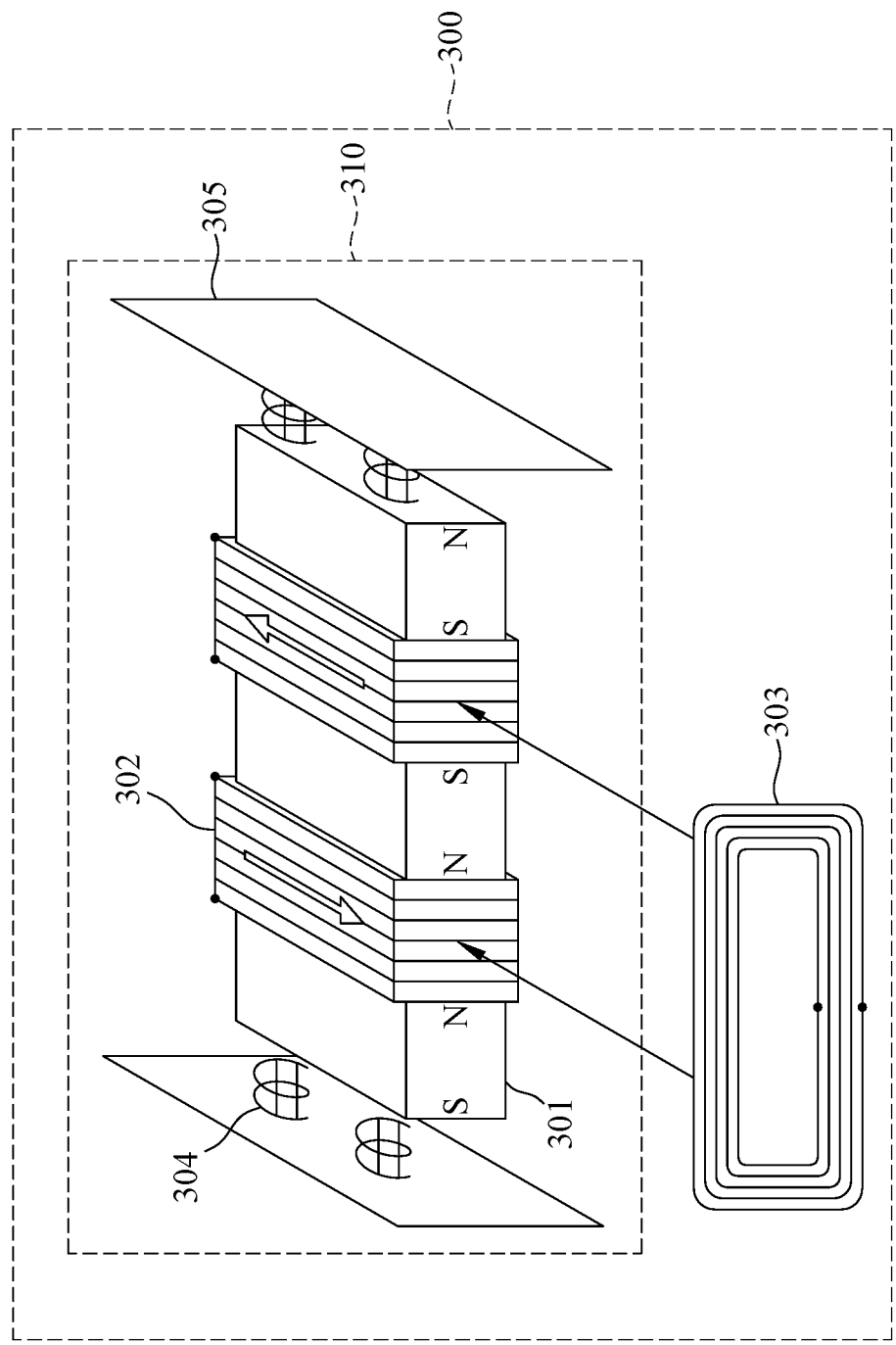
FIG. 3 is a schematic view showing a linear resonant actuator having a induction coil for sensing speed according to the present invention.

Referring to FIG. 3, FIG. 3 is a linear resonant actuator having an induction coil for sensing speed. Since the vibrator 301 includes a magnet set, a specific spatial magnetic field vector distribution B is generated, and the movement of the vibrator 301 causes a magnetic field vector moving speed V; under this condition, the force f of a fixed electric charge q can be expressed as follows:

$$f=-qV \times B$$

Which is the Lorentz force, that is, the induced electric field $E=-V \times B$.

Therefore, a fixed wire segment dl can obtain an induced electromotive force de expressed as:

$$de=-dl \cdot E=-dl \cdot (V \times B)$$

Therefore, through the proper position and the winding manner of the disposition of the induction coil 303, an induction voltage proportional to the moving speed of the vibrator 301 can be obtained.

In other words, according to the induction coil 303 generating an induction voltage proportional to the moving speed of the vibrator 301, the vibration of the near-resonant frequency can be generated through the feedback, and the vibration method for controlling the linear resonant actuator can be achieved.

According to the motion equation $m^*a=-b^*v-k^*x+f$; wherein m is the mass of the vibrator, b is the actuator damping coefficient, k is the elastic coefficient, a is the acceleration, v is the speed, and x is the displacement, f is the driving force; and $k^*x$ is the displacement restoring force, $b^*v$ is the resistance, and f=0 when there is no driving.

Let $f=b'^*v$ denote the driving force caused by the driving coil in the vibration control method of the present invention to be fed back, wherein b' is the system gain coefficient (force/speed) of the driving action, including the sensitivity of the induction coil (voltage/speed), and actuator drive efficiency (force/voltage) multiplied by the control system gain.

Therefore, the above motion equation becomes: $m^*a=(b'-b)^*v-k^*x$;

Wherein $(b'-b)^*v$ is the total driving force under the continuous vibration state of the present invention; therefore, $(b'-b)>0$ ensures that the amount of vibration does not decrease in a specific range of vibration speeds; above a specific speed, $(b'-b)<0$ to suppress vibration; in the equilibrium condition, the vibrator is in an approximately undamped and natural continuous vibration state. The so-called specific vibration speed refers to the upper limit of the speed, that is, the target speed of continuous vibration.

Figure 4:
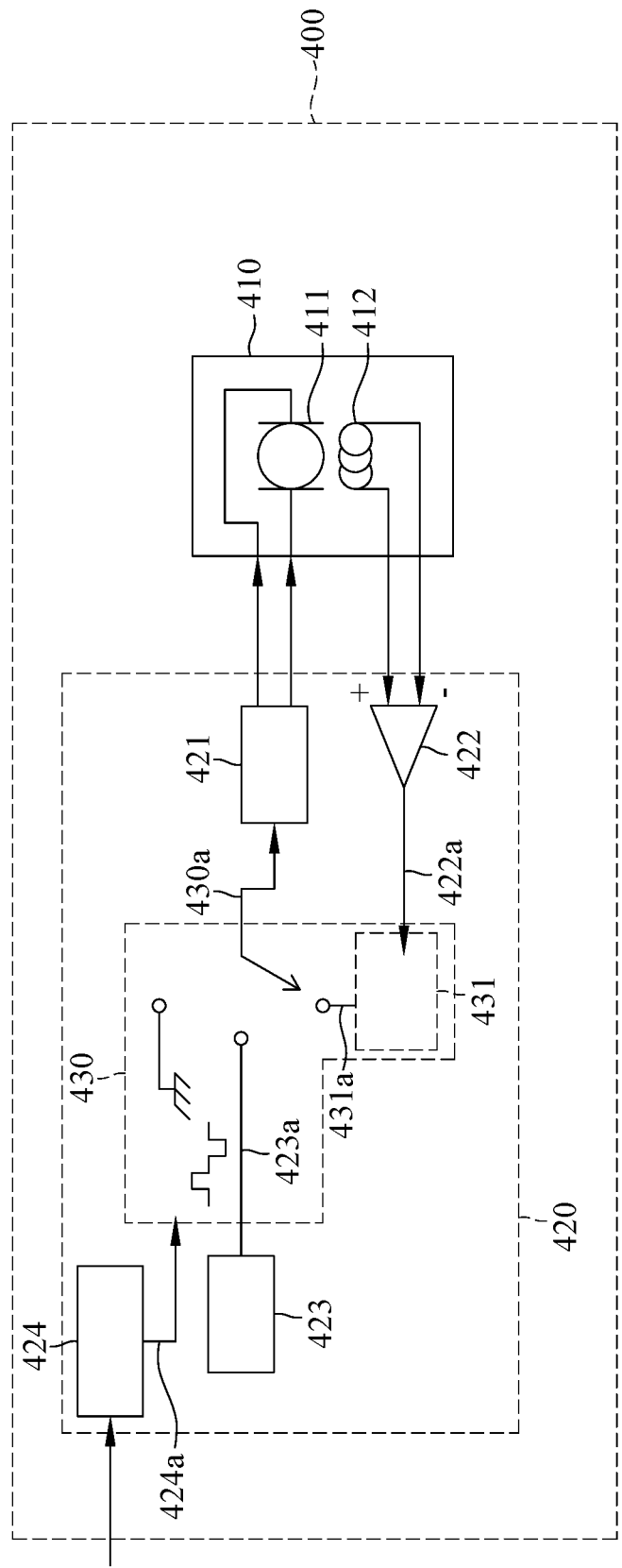
FIG. 4 is a schematic view showing a control system of a linear resonant actuator of the present invention.

FIG. 4 is a control system of a linear resonant actuator according to the present invention, which is applicable to a linear resonant actuator 411 having a induction coil for sensing speed 412. The control system 420 comprises: a driver 421, a signal amplifier 422, and an excitation device 423, a flow controller 424, and a processing unit 430; wherein the processing unit 430 further comprises a vibration generating unit 431.

The driver 421 is connected to the processing unit 430 and the linear resonant actuator 411 to drive the linear resonant actuator 411 according to a driving signal 430*a* outputted by the processing unit 430. The signal amplifier 422 is connected to the induction coil 412 of the linear resonant actuator 411, and the induction voltage of the induction coil 412 of the linear resonant actuator 411 is amplified into an induction signal 422*a*, and the induction signal 422*a* is fed back to the vibration generating unit 431 of the processing unit 430. The excitation device 423 is configured to generate an excitation signal 423*a* that causes the linear resonant actuator 411 to vibrate, and transmit the excitation signal 423*a* to the processing unit 430. The flow controller 424 is configured to receive an external incoming command, generate a control flow, and output a state signal 424*a* corresponding to the control flow to the processing unit 430. The processing unit 430 is connected to the signal amplifier 422, the excitation device 423, and the flow controller 424 to output the driving signal 430*a* to the driver 421 according to the state signal 424*a* outputted by the flow controller 424. The vibration generating unit 431 is connected to the signal amplifier 422 to receive the induction signal 422*a*, and generates a vibration signal 431*a* according to the induction signal 422*a*.

It should be noted that the control system operates in at least three states: a stop state, an excitation state, and a continuous vibration state. That is, the state signal 424*a* outputted by the flow controller 424 can be a stop state, an excitation state, or a continuous vibration state. In the stop state, the driving signal 430*a* outputted by the processing unit 430 is "stop", that is, to remain in a stop and not moving; in the excitation state, the processing unit 430 outputs the excitation signal 423*a* as the driving signal 430*a* to the driver 421; in the continuous vibration state, the vibration generating unit 431 of the processing unit 430 processes the induction signal 422*a* of the signal amplifier 422 into a suitable vibration signal 431*a*, which the driving signal 430*a* outputs as the driving signal 430*a* to the driver 421. In other words, the driving signal 430*a* outputted by the processing unit 430 can be a stop signal (or no output signal) in a stop state, an excitation signal 423*a* in an excitation state, or a vibration signal 431*a* in a continuous vibration state.

In summary, the control system does not drive the linear resonant actuator 411 in the stop state. In the excitation state, the control system can generate the excitation signal 423*a* through the excitation device 423, and drive the linear resonant actuator 411 via the driver 421 to achieve the target to start the vibration. The excitation device 423 can achieve the vibrating by outputting a predetermined waveform or adjust the frequency, time interval, polarity, and amplitude of other adjustable output waveform. In the continuous vibration state, the control system can amplify the induction voltage generated by the induction coil 412 into the induction signal 422*a*, then process the induction signal 422*a* and feed back to the vibration generating unit 431 of the processing unit 430, and the vibration generating unit 431 processes the induction signal 422*a* into an appropriate vibration signal 431*a*, which the processing unit 430 outputs as the driving signal 430*a* to drive the linear resonant actuator 411 to keep the vibrator vibrating; and the termination of the continuous vibration state can be achieved by the state signal.

It should be noted that the vibration signal 431*a* of the processing unit 430 in FIG. 4 can be implemented in different embodiments according to application requirements. The main implementation approach is to set the control system gain according to the driving efficiency of the linear resonant actuator and the sensitivity of the induction coil, so that $(b'-b)^*v$ can achieve the desired driving effect; as mentioned above, b' is the system gain coefficient of the driving effect, including induction coil sensitivity (voltage/speed) and actuator driving efficiency (force/voltage) multiplied by control system gain. Therefore, in the specific range of vibration speed, keeping $(b'-b)>0$ ensures that the vibration displacement does not decrease; above the specific vibration speed, keeping $(b'-b)<0$ suppresses the vibration; when in equilibrium the vibrator is in a natural continuous vibration state approximately damping-free.

It should be noted that since the velocity is directional (with positive/negative), since the vibration system is symmetric, in the following discussion, the directional velocity is replaced by the non-directional speed to simplify the complexity. In this context, the speed and velocity in the disclosure is exchangeable.

In an embodiment of the invention, the vibration generating unit 431 can set a low-speed threshold value and a high-speed threshold value (i.e., the foregoing specific speed), wherein when the instantaneous vibration speed of the vibrator is below the low-speed threshold, a driving force in the same direction is applied to increase the vibration speed; when the instantaneous vibration speed of the vibrator is above the high-speed threshold, a driving force in the opposite direction is applied to reduce the vibration speed; when the instantaneous vibration speed of the vibrator is between the low-speed threshold and the high-speed threshold, no force is applied to maintain the vibration speed; the high-speed threshold is the aforementioned specific speed. In a preferred embodiment, the vibration generating unit 431 can further set a noise threshold, and the instantaneous vibration speed below the noise threshold is regarded as noise, and is not enhanced or maintained.

Because the induction voltage obtained by the induction coil 412 of the linear resonant actuator 411 is proportional to the instantaneous vibration speed of the vibrator, and the signal amplifier 422 is connected to the induction coil 412 of the linear resonant actuator 411 to amplify the induction voltage obtained by the induction coil 412 of the linear resonant actuator 411 into the induction signal 422a, the low-speed threshold, the high-speed threshold and the noise threshold can be expressed in the form of voltage levels.

Therefore, the vibration generating unit 431 can internally set at least one group of six voltage values V1, V2, V3, V4, V5, and V6, and V6≥V5≥V4≥V3≥V2≥V1; in other words, the six voltage values define seven voltage intervals; wherein, less than V1 is the first interval, [V1, V2] is the second interval, [V2, V3] is the third interval, [V3, V4] is the fourth interval, [V4, V5] is the fifth interval, [V5, V6] is the sixth interval, greater than V6 is the seventh interval; V4≥Vo≥V3 defines the noise threshold, wherein Vo is the induction signal when in stop state, V5 and V2 respectively define positive and negative low-speed threshold in forward and reverse directions, and V6 and V1 respectively define positive and negative high-speed threshold in forward and reverse directions.

In other words, when the induction signal 422a (related to the instantaneous vibration speed of the vibrator) is in the fourth interval (within the noise threshold), the vibration signal 431a outputted by the vibration generating unit 431 is zero, that is, the instantaneous vibration speed of the vibrator is regarded as noise, and no force is applied; when the induction signal 422a is in the first interval or the seventh interval (higher than the high-speed threshold), the vibration signal 431a outputted by the vibration generating unit 431 is positive (or negative for the seventh interval), that is, a driving force in a reverse direction is applied to reduce the vibration speed; when the induction signal 422a is in the second interval or the sixth interval (between the high-speed threshold and the low-speed threshold), the vibration signal 431a outputted by the vibration generating unit 431 is zero, that is, no force is applied, and the instantaneous vibration speed is maintained by the vibrator; when the induction signal 422a is in the third interval or the fifth interval (below the low-speed threshold), if the previous half cycle is not in the first interval or the seventh interval, the vibration signal 431a outputted by the vibration generating unit 431 is negative (or positive for the fifth interval), that is, the driving force in the same direction is applied to increase the vibration speed of the vibrator. Otherwise, if the previous half cycle is ever in the first interval or the seventh interval, the output signal 431a of the vibration is unspecified, i.e., may be positive, negative or zero (a force in the same or reserve direction can be applied, or no force is applied). Table 1 shows a state table for the vibration signal 431a in the context of the relationship between the voltage Vs of the induction signal 422a and the voltage values V1 to V6.

TABLE 1

State Table (Vs is induction signal 422a)

| relation | Voltage interval | output (431a) | |
|---|---|---|---|
| Vs ≤ V1 | $1^{st}$ interval | positive | |
| V1 < Vs ≤ V2 | $2^{nd}$ interval | zero | |
| V2 < Vs ≤ V3 | $3^{rd}$ interval | Previous half cycle not in $1^{st}$ or $7^{th}$ intervals | negative |
| | | Previous half cycle ever in $1^{st}$ or $7^{th}$ intervals | unspecified |
| V3 < Vs < V4 | $4^{th}$ interval | zero | |
| V4 ≤ Vs < V5 | $5^{th}$ interval | Previous half cycle not in $1^{st}$ or $7^{th}$ intervals | positive |
| | | Previous half cycle ever in $1^{st}$ or $7^{th}$ intervals | unspecified |
| V5 ≤ Vs < V6 | $6^{th}$ interval | zero | |
| V6 ≤ Vs | $7^{th}$ interval | negative | |

It should be noted that in Table 1, the previous half cycle refers to half a cycle prior to the time point in the interval, and the cycle refers to a specific cycle wherein the linear resonant actuator is driven to maintain a back-and-forth motion in a state of continuous vibration under the continuous vibration state. Taking the third interval as an example, when the induced signal voltage is in the third interval, whether the induced signal voltage is once in the first interval or the seventh interval (higher than the specific speed, i.e., higher than the high-speed threshold) during the previous half cycle will determine the output of the vibration signal 431a.

The third interval, fifth interval, and corresponding induction signal 422a are respectively lower than the low-speed threshold, a force in the same direction as V (speed) is applied to ensure that the vibration is not decayed. At the fifth interval, the speed of Vs≥V4 (>Vo) is positive. When Vs is in the range of [V4, V5], the output is positive, and the force is in the same direction as the speed, thus a thrust; in the third interval, the speed of Vs≤V3 (>Vo) is negative. When the output is negative in the [V2, V3] interval, the force is in the same direction as the speed, thus as a thrust.

The third interval or the fifth interval is mainly to generate a thrust in the same direction as speed; but if the signal entering the third interval or the fifth interval has ever been in the first interval or the seventh interval, it means that the vibration speed of the vibrator exceeds the specific limit (higher than high-speed threshold). In this case, the output of the third interval or the fifth interval is unspecified, and may be selected to match the damping characteristic of the linear resonant actuator, or to suppress vibration, enhance vibration or no force applied.

In summary, when the back-and-forth vibration speed of the vibrator among the above seventh intervals, the vibration signal 431a outputted by the vibration generating unit 431 can be described as follows:

(a) If the vibration speed is low throughout the cycle, the induced signal 422a (associated with the instantaneous speed of the vibrator) is completely in the fourth interval, the output is zero, which is to avoid acting incorrectly due to noise or signal drift.

(b) If the vibration speed is higher than (a), the induction signal 422a goes back-and-forth between the third, fourth, and fifth intervals; and when in the third and fifth intervals, a force in the same direction as the speed is outputted to increase speed.

(c) If the vibration speed is higher than (b), the induction signal 422a goes back-and-forth between the second interval and the sixth interval; when in the second and the sixth intervals, the output is zero, which means that the speed is sufficient; when in the third and fifth intervals, a force in the same direction as the speed is outputted to compensate for potential damping.

(d) If the vibration speed is higher than (c), the induction signal 422a goes back-and-forth between the first interval and the seventh interval, indicating that the specific speed has been exceeded, and the output signal 422a should output a signal that is opposite to the direction of the speed when in the first and seventh intervals to reduce the speed and to force the speed returning to (c).

In another embodiment, the voltage set is not limited to one and different sets of voltage intervals can be used to generate different vibration extents. Alternatively, the above six-voltage set V1-V6 may be simplified, for example, V1 may be equal to V2 and/or V6 may be equal to V5; in other words, the second interval may be omitted and/or the sixth interval may be omitted. Even in other embodiments, only one of "positive" or "negative" in combination with a "zero" output may be used; or, only the outputs of the first interval to the fourth interval, or outputs of the fourth interval to the seventh interval are used. Furthermore, in the continuous vibration state, after the signal output of the vibration signal 431a is changed due to the change of interval, the vibration signal 431a can maintain the output of the state for a predetermined short duration and then determine the interval and update the output.

Figure 5:
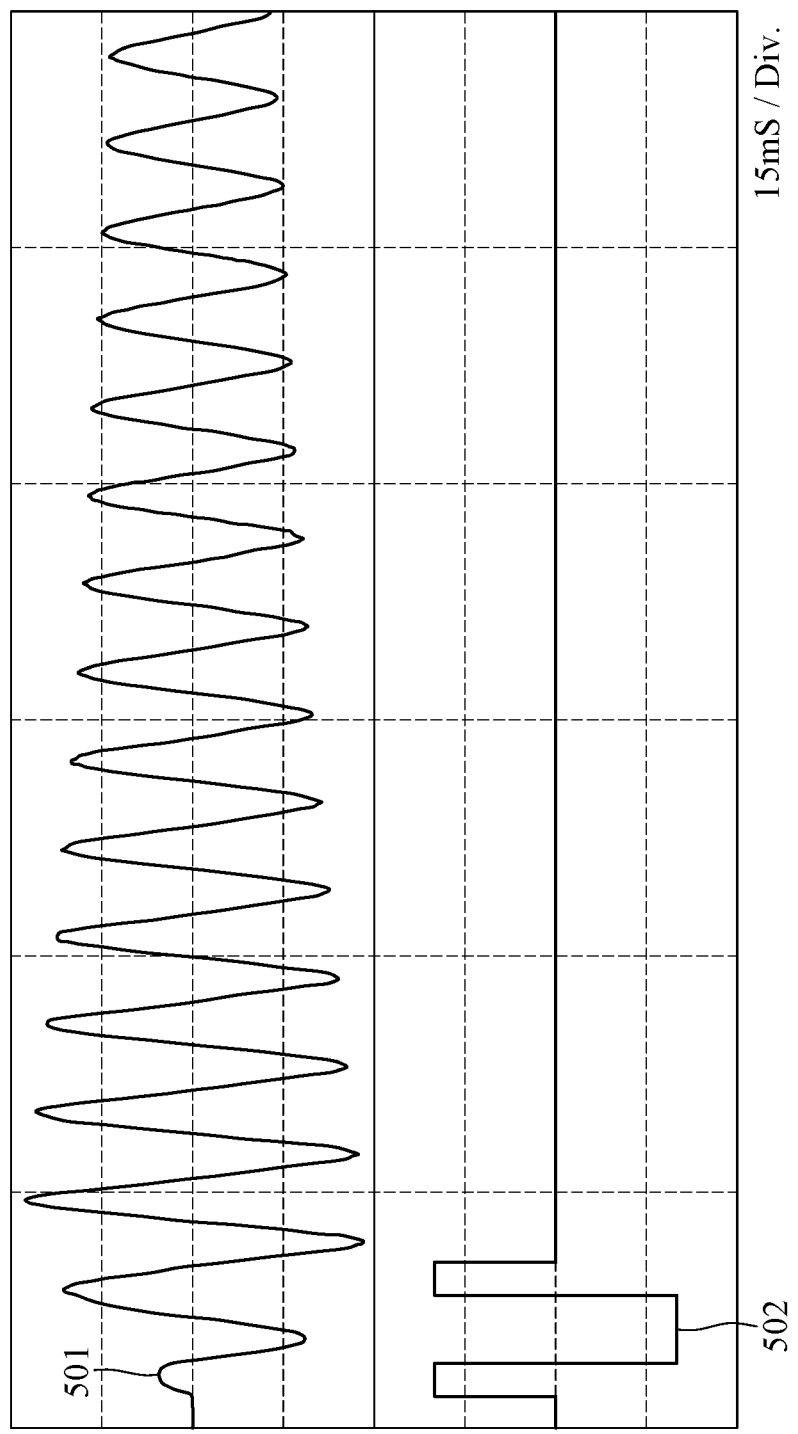
FIG. 5 is a schematic view showing the waveform of the excitation state of the linear resonant actuator of the present invention.

FIG. 5 is a schematic view showing the waveform of the excitation state of the linear resonant actuator of the present invention; wherein the curve 501 is the induction signal 422a, representing the vibration speed of the vibrator, the curve 502 is the excitation signal 423a; and the vibrator vibrates due to the excitation signal 423a. If there is no other driving after the end of the excitation signal 423a, the vibration of the vibrator is gradually decayed as shown by the curve 501.

Figure 6:
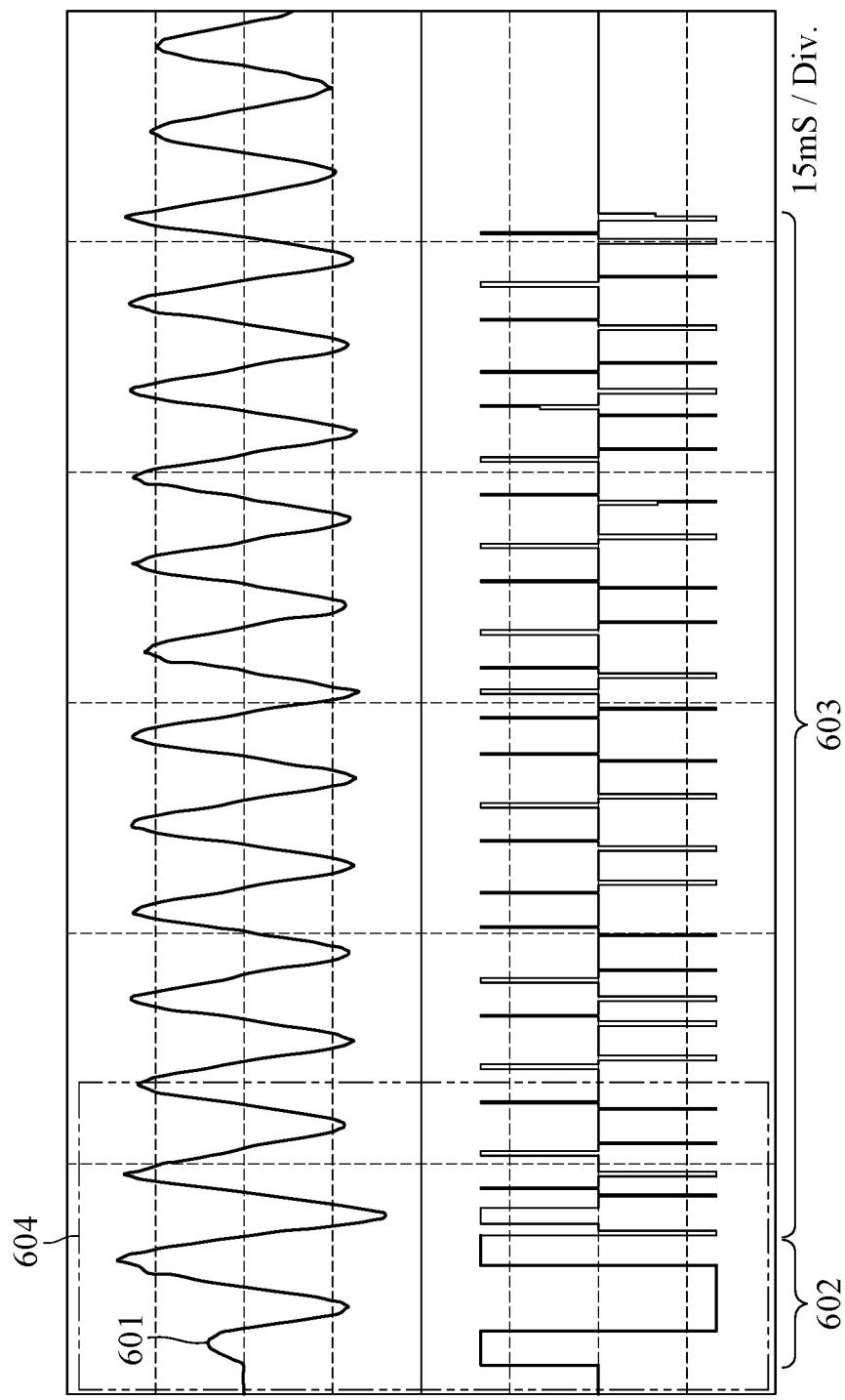
FIG. 6 is a schematic view showing the waveform of the linear resonant actuator of the present invention in a continuous vibration state.

FIG. 6 is a schematic view showing the waveform of the linear resonant actuator in the continuous vibration state of the present invention; wherein the curve 601 is the induction signal 422a, representing the vibration speed of the vibrator, the curve 602 is the excitation signal 423a, and the curve 603 is the vibration signal 431a; the vibrator vibrates due to the excitation of the excitation signal 423a, and continues to vibrate due to the vibration signal 431a (curve 603) after the excitation signal 423a (curve 602) ends; the vibrator maintains a stable vibration under the adjustment of the vibration signal 431a. If there is no other driving after the end of the vibration signal 431a, the vibration of the vibrator is gradually decayed, and the details of the dashed box 604 are detailed in FIG. 7.

Figure 7:
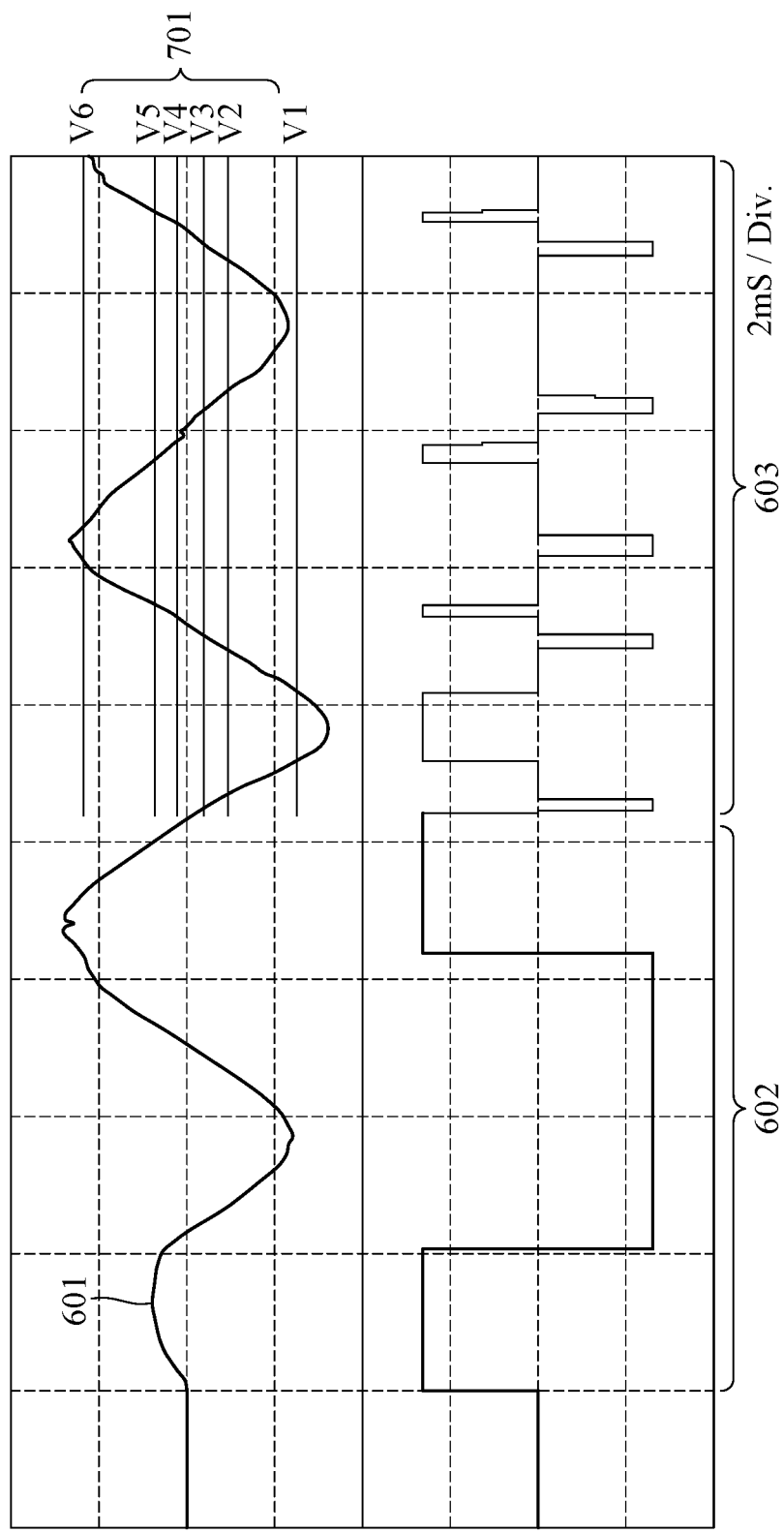
FIG. 7 shows the details in the dashed box 604 of FIG. 6.

FIG. 7 shows the details in the dashed box 604 of FIG. 6. The curve 601 is the induction signal 422a, which represents the vibration speed of the vibrator, the curve 602 is the excitation signal 423a, and the curve 603 is the vibration signal 431a. The vibrator vibrates due to the excitation of the excitation signal 423a, and continues to vibrate due to the vibration signal 431a (curve 603) after the excitation signal 423a (curve 602) ends. The six horizontal lines 701 indicates six-voltage set V1-V6 in the vibration generating unit 431; the relationship between the induction signal 422a and the voltage levels V1-V6 is to output as the vibration signal 431a as shown in Table 1.

Figure 8:
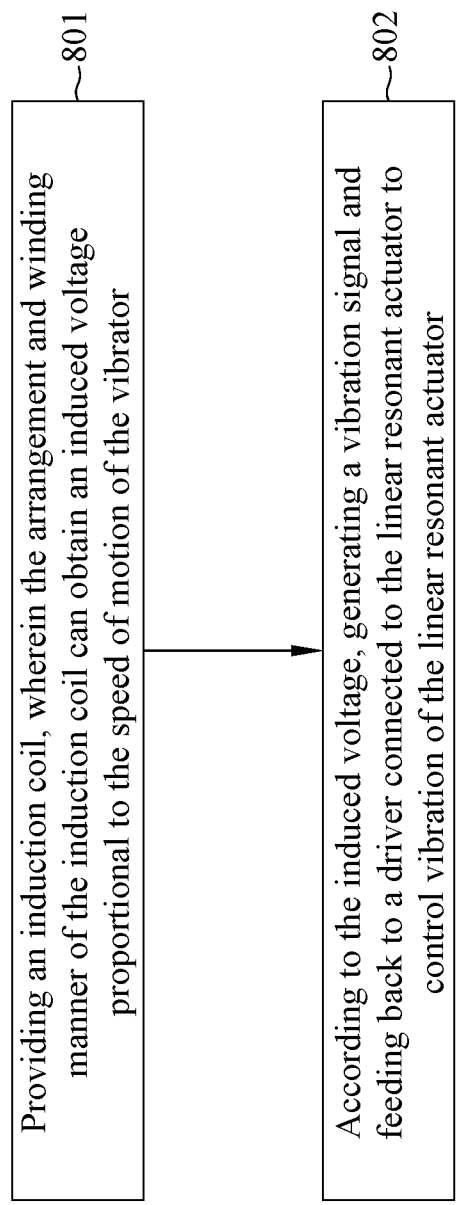
FIG. 8 is a flow chart showing a method of controlling the linear resonant actuator of the present invention.

FIG. 8 is a flow chart showing a vibration control method of a linear resonant actuator according to the present invention, comprising the following steps:

Step 801: providing an induction coil, the induction coil is disposed outside the vibrator of the linear resonant actuator, and the induction coil is fixed with respect to the vibrator, wherein the arrangement and winding manner of the induction coil can obtain an induction voltage proportional to the speed of motion of the vibrator;

Step 802: according to the induction voltage, generating a vibration signal and feeding back to a driver connected to the linear resonant actuator to control vibration of the linear resonant actuator; wherein the generated vibration signal satisfies the following conditions:

when the induction voltage is lower than a low-speed threshold, the vibration signal causes the driver to apply a driving force in the same direction;

when the induction voltage is higher than a high-speed threshold, the vibration signal causes the driver to apply a driving force in a reverse direction;

when the induction voltage is between the low-speed threshold and the high-speed threshold, the vibration signal does not drive the driver to apply force.

In a preferred embodiment, a noise threshold can be set, and the induction voltage below the noise threshold is regarded as noise, and the vibration signal does not drive the driver to apply force.

In a preferred embodiment, at least one group of six voltage values V1, V2, V3, V4, V5, and V6 can be configured, and V6≥V5≥V4≥V3≥V2≥V1; in other words, the six voltage values define seven voltage intervals; wherein, less than V1 is the first interval, [V1, V2] is the second interval, [V2, V3] is the third interval, [V3, V4] is the fourth interval, [V4, V5] is the fifth interval, [V5, V6] is the sixth interval, greater than V6 is the seventh interval; V4≥Vo≥V3 defines the noise threshold, wherein Vo is the induction signal when in stop state, V5 and V2 respectively define positive and negative low-speed threshold in forward and reverse directions, and V6 and V1 respectively define positive and negative high-speed threshold in forward and reverse directions.

In other words, when the induction signal (related to the instantaneous vibration speed of the vibrator) is in the fourth interval (within the noise threshold), the vibration signal is zero and no force is applied; when the induction signal is in the first interval or the seventh interval (higher than the high-speed threshold), the vibration signal is positive (or negative for the seventh interval), that is, a driving force in a reverse direction is applied to reduce the vibration speed; when the induction signal is in the second interval or the sixth interval (between the high-speed threshold and the low-speed threshold), the vibration signal is zero, that is, no force is applied, and the instantaneous vibration speed is maintained by the vibrator; when the induction signal is in the third interval or the fifth interval (below the low-speed threshold), if the previous half cycle is not in the first interval or the seventh interval, the vibration signal is negative (or positive for the fifth interval), that is, the driving force in the same direction is applied to increase the vibration speed of the vibrator. Otherwise, if the previous half cycle is ever in the first interval or the seventh interval, the output signal of the vibration is unspecified; wherein the previous half cycle refers to half a cycle prior to the time point in the interval, and the cycle refers to a specific cycle wherein the linear resonant actuator is driven to maintain a back-and-forth motion in a state of continuous vibration under the continuous vibration state.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A control system for a linear resonant actuator, applicable to a linear resonant actuator having an induction coil for sensing vibration speed of the linear resonant actuator, the control system comprising: a driver, a signal amplifier, an excitation device, a flow controller, and a processing unit;
   wherein the processing unit further comprising a vibration generating unit;
   the driver being coupled to the processing unit and the linear resonant actuator to drive the linear resonant actuator according to a driving signal outputted by the processing unit; the signal amplifier being connected to the induction coil of the linear resonant actuator, and the induction voltage of the induction coil of the linear resonant actuator being amplified into an induction signal, and the induction signal being fed back to the vibration generating unit of the processing unit;
   the excitation device being configured to generate an excitation signal to cause the linear resonant actuator to vibrate, and transmitting the excitation signal to the processing unit;
   the flow controller being configured to receive an external command, generate a control flow, and output a state signal corresponding to the control flow to the processing unit;
   the processing unit being connected to the signal amplifier, the excitation device, and the flow controller to output the driving signal to the driver according to the state signal output by the flow controller, wherein the vibration generating unit being connected to the signal amplifier for receiving the induction signal and generating a vibration signal according to the induction signal;
   wherein the vibration generating unit setting a low-speed threshold value and a high-speed threshold value;
   wherein when instantaneous vibration speed of the linear resonant actuator being below the low-speed threshold, a driving force in the same direction being applied to increase the vibration speed;
   when the instantaneous vibration speed of the linear resonant actuator being above the high-speed threshold, a driving force in the opposite direction being applied to reduce the vibration speed;
   when the instantaneous vibration speed of the linear resonant actuator being between the low-speed threshold and the high-speed threshold, no force being applied to maintain the vibration speed.

2. The control system for a linear resonant actuator according to claim 1, wherein the state signal is a stop state, an excitation state, or a continuous vibration state;
   wherein in the stop state, the control system does not drive the linear resonant actuator, the control system is used to obtain a DC offset of the induction signal for compensation;
   wherein, in the excitation state, the excitation device transmits a predetermined waveform, or adjusts frequency, time interval, polarity, amplitude of other adjustable output waveform to achieve vibration; the control system achieves to excite the linear resonant actuator to start vibrating by transmitting the excitation signal to the driver;
   wherein, in the continuous vibration state, the control system amplifies the induction voltage obtained by the induction coil into an induction signal, and outputs the vibration signal to the driver after processing to increase or suppress the vibration of the linear resonant actuator.

3. The control system for a linear resonant actuator according to claim 1, wherein a noise threshold is set, and the induction voltage below the noise threshold is regarded as noise, and the vibration signal does not drive the driver to apply force.

4. The control system for a linear resonant actuator according to claim 3, wherein at least one group of six voltage levels V1, V2, V3, V4, V5, and V6 is set in the vibration generating unit, and $V6 \geq V5 \geq V4 \geq V3 \geq V2 \geq V1$; the six voltage values define seven voltage intervals;
   wherein, less than V1 is the first interval, [V1, V2] is the second interval, [V2, V3] is the third interval, [V3, V4] is the fourth interval, [V4, V5] is the fifth interval, [V5, V6] is the sixth interval, greater than V6 is the seventh interval; $V4 \geq Vo \geq V3$ defines the noise threshold, wherein Vo is the induction signal when in stop state, V5 and V2 respectively define positive and negative low-speed threshold in forward and reverse directions, and V6 and V1 respectively define positive and negative high-speed threshold in forward and reverse directions;
   when the induction signal is in the fourth interval, the vibration signal is zero and no force is applied;
   when the induction signal is in the first interval or the seventh interval, the vibration signal is positive for the first interval and negative for the seventh interval, to apply a driving force in a reverse direction to reduce the vibration speed;
   when the induction signal is in the second interval or the sixth interval, the vibration signal is zero, and no force is applied, and the instantaneous vibration speed is maintained by the vibrator;
   when the induction signal is in the third interval or the fifth interval, if the previous half cycle is not in the first interval or the seventh interval, the vibration signal is negative for the third or positive for the fifth interval, that is, the driving force in the same direction is applied to increase the vibration speed of the vibrator; otherwise, if the previous half cycle is ever in the first interval or the seventh interval, the output signal of the vibration is unspecified;
   wherein the previous half cycle refers to half a cycle prior to the time point in the interval, and the cycle refers to a specific cycle wherein the linear resonant actuator is driven to maintain a back-and-forth motion in a state of continuous vibration under the continuous vibration state.

5. The control system for a linear resonant actuator according to claim 4, wherein V1 is equal to V2 and/or V6 is equal to V5.

6. The control system for a linear resonant actuator according to claim 4, wherein only one of the positive and negative, in combination with zero, is used as to output the vibration signal.

7. The control system for a linear resonant actuator according to claim 4, wherein in the continuous vibration state, after the signal output of the vibration signal is changed due to the change of interval, the vibration signal maintains the output of the state for a predetermined short duration and then determine the interval and update the output.

8. The control system for a linear resonant actuator according to claim 4, wherein only the outputs of the first interval to the fourth interval, or outputs of the fourth interval to the seventh interval are used.

9. A vibration control method for a linear resonant actuator, comprising the following steps:
    providing an induction coil, the induction coil being disposed outside a vibrator of the linear resonant actuator, and the induction coil being fixed with respect to the vibrator, wherein the arrangement and winding manner of the induction coil able to obtain an instantaneous induction voltage proportional to vibration speed of the vibrator;
    according to the instantaneous induction voltage, a vibration signal being generated and fed back to a driver connected to the linear resonant actuator to control the vibration of the linear resonant actuator; wherein the generated vibration signal satisfying the following conditions:
    when the instantaneous induction voltage being lower than a low-speed threshold, the vibration signal causing the driver to apply a driving force in the same direction;
    when the instantaneous induction voltage being higher than a high-speed threshold, the vibration signal causing the driver to apply a driving force in the opposite direction;
    when the instantaneous induction voltage being between the low-speed threshold and the high-speed threshold, the vibration signal not driving the driver to apply force.

10. The vibration control method for a linear resonant actuator according to claim 9, wherein a noise threshold is set, and the induction voltage below the noise threshold is regarded as noise, and the vibration signal does not drive the driver to apply force.

11. The vibration control method for a linear resonant actuator according to claim 10, wherein at least one group of six voltage levels V1, V2, V3, V4, V5, and V6 is set, and $V6 \geq V5 \geq V4 \geq V3 \geq V2 \geq V1$; the six voltage values define seven voltage intervals;
    wherein, less than V1 is the first interval, [V1, V2] is the second interval, [V2, V3] is the third interval, [V3, V4] is the fourth interval, [V4, V5] is the fifth interval, [V5, V6] is the sixth interval, greater than V6 is the seventh interval; $V4 \geq Vo \geq V3$ defines the noise threshold, wherein Vo is the induction signal when the linear resonant actuator is not in vibration, V5 and V2 respectively define positive and negative low-speed threshold in forward and reverse directions, and V6 and V1 respectively define positive and negative high-speed threshold in forward and reverse directions;
    when the instantaneous induction signal is in the fourth interval, the vibration signal is zero and no force is applied;
    when the instantaneous induction signal is in the first interval or the seventh interval, the vibration signal is positive for the first interval or negative for the seventh interval, to apply a driving force in a reverse direction to reduce the vibration speed;
    when the instantaneous induction signal is in the second interval or the sixth interval, the vibration signal is zero, and no force is applied, and the instantaneous vibration speed is maintained by the vibrator;
    when the instantaneous induction signal is in the third interval or the fifth interval, if the previous half cycle is not in the first interval or the seventh interval, the vibration signal is negative for the third interval or positive for the fifth interval, that is, the driving force in the same direction is applied to increase the vibration speed of the vibrator; otherwise, if the previous half cycle is ever in the first interval or the seventh interval, the output signal of the vibration is unspecified;
    wherein the previous half cycle refers to half a cycle prior to the time point in the interval, and the cycle refers to a specific cycle wherein the linear resonant actuator is driven to maintain a back-and-forth motion in a state of continuous vibration.

* * * * *